US005695804A

United States Patent [19]
Hnat et al.

[11] Patent Number: 5,695,804
[45] Date of Patent: *Dec. 9, 1997

[54] PRODUCTION OF CHIP-LIKE DURUM WHEAT-BASED SNACKS

[75] Inventors: Diane L. Hnat, Danbury, Conn.; Harry Levine; Louise Slade, both of Morris Plains, N.J.; Richard P. Maitland, Hackettstown, N.J.; Wayne Brown, Mississauga, Canada; Patricia A. Mozeke, Bedminster, N.J.

[73] Assignee: Nabisco Technology Company, Wilmington, Del.

[*] Notice: The term of this patent shall not extend beyond the expiration date of Pat. No. 5,320,858.

[21] Appl. No.: 217,466

[22] Filed: Mar. 24, 1994

[51] Int. Cl.$^6$ .............................. A21D 2/36; A21D 6/00; A21D 8/02; A23L 1/10
[52] U.S. Cl. ...................... 426/550; 426/549; 426/560
[58] Field of Search ........................ 426/549, 560, 426/550

[56] References Cited

U.S. PATENT DOCUMENTS

| | | |
|---|---|---|
| 678,749 | 7/1901 | Moore et al. . |
| 1,039,912 | 4/1912 | Dollings . |
| 1,169,023 | 1/1916 | Embrey . |
| 1,975,326 | 10/1934 | Loose et al. . |
| 2,204,045 | 6/1940 | Meacham . |
| 2,505,407 | 4/1950 | Johnson . |
| 2,767,667 | 10/1956 | Spooner . |
| 2,823,625 | 2/1958 | Oakes . |
| 2,905,559 | 9/1959 | Anderson et al. . |
| 3,027,258 | 3/1962 | Markakis et al. . |
| 3,089,773 | 5/1963 | Bates et al. . |
| 3,276,397 | 10/1966 | Poppe et al. . |
| 3,278,311 | 10/1966 | Brown et al. . |
| 3,332,781 | 7/1967 | Benson et al. . |
| 3,348,950 | 10/1967 | Weiss . |
| 3,384,495 | 5/1968 | Potter et al. . |
| 3,451,822 | 6/1969 | Fast et al. . |
| 3,493,390 | 2/1970 | Succo . |
| 3,519,432 | 7/1970 | Succo et al. . |
| 3,539,356 | 11/1970 | Benson et al. . |
| 3,600,193 | 8/1971 | Glabe . |
| 3,615,658 | 10/1971 | Glabe . |

(List continued on next page.)

FOREIGN PATENT DOCUMENTS

| | | |
|---|---|---|
| 637258 | 2/1962 | Canada . |
| 0184964 | 6/1986 | European Pat. Off. . |
| 2267049 | 11/1975 | France . |
| 2604716 | 8/1976 | Germany . |
| 59001786 | 1/1979 | Japan . |
| 54-32056 | 10/1979 | Japan . |
| 55-108250 | 8/1980 | Japan . |
| 59-031642 | 2/1984 | Japan . |
| 60-168361 | 8/1985 | Japan . |
| 60-244256 | 12/1985 | Japan . |
| 61-202658 | 9/1986 | Japan . |
| 370933 | 11/1973 | U.S.S.R. . |
| 107218 | 6/1917 | United Kingdom . |
| 1525631 | 9/1978 | United Kingdom . |
| 2111816 | 7/1983 | United Kingdom . |

OTHER PUBLICATIONS

Samuel A. Martz, Ph.D., Formulas and Processes for Bakers, 1987 Pan–Tech International, Inc., pp. 63, 65, 174–175.
Whistler, R. L., *Starch: Chemistry and Technology*, Academic Press, Inc., 1984, pp. 588–590.
Matz, *Cookie and Cracker Technology*, 2nd ed., The AVI Publishing Co., Inc., (1968), pp. 11–12.
Atwell, et al, "The Terminology and Methodology Associated with Basic Starch Phenomena", Cereal Food World, vol. 33, No. 3, 1968, pp. 306–311.
Talbot & Smith, *Potato Processing*, 4th ed., The AVI Publishing Co., Inc., (1987), p. 778.
Chemical Abstract #58556d of 17 Foods vol. 80, 1974.
Tressler, Donald K., Ph.D., *Food Products Formulary*, vol. 2, Cereals, Baked Goods, Dairy and Egg Products, The AVI Publ. Co., Westport, CT, pp. 103–104 (1975).
"Low Calorie, Baked Snack . . . ' Potato Pips", *Engineering Foods Magazine*, p. 58 (Aug. 8, 1984).
Pyler, E.J., "Baking Science and Technology", Siebel Publ. Co., Chicago, IL, 1973, pp. 428–429.
Matz, S.A., *Cookie and Cracker Technology*, The AVI Publ. Co., Chapter 18, pp. 238–253 (1968).
Pyler, E.J., *Baking Science & Technology*, Sosland Publ. Co., Merriam, KS, 1988, pp. 1061–1062, 913 and 609.
Matz, S.A., *Cookie and Cracker Technology*, the AVI Publ. Co., pp. 265–266 (1968).
*Foods and Food Production Encyclopedia*, Van Nostrand Reinhold Co., Inc. NY, NY, 1982, pp. 282–284.
Desrosier, N. W., *Elements of Food Technology*, AVI Publ. Co., Westport, CT, 1977, pp. 479–482 and 468–469.
Kotschevar, L.H., *Standards, Principles, and Techniques in Quality Food Production*, Van Nostrand Reinhold, NY, NY, 1988, pp. 404–407.
Matz, *Cereal Technology*, AVI Publ. Company, Westport, CT, (1970), pp. 20–21, 38–40, 246–252.

*Primary Examiner*—Arthur L. Corbin

[57] ABSTRACT

A durum wheat-based ingredient, preferably durum wheat flour, is used in the production of chip-like snacks having a very crunchy, fracturable, non-mealy texture. A machinable dough is formed from at least one durum wheat ingredient, such as durum flour, a no-gluten or low-gluten content starchy material, such as dehydrated potato flakes, water, and a reducing agent, such as sodium metabisulfite. The amount of the durum wheat ingredient may be from about 45% by weight to about 75% by weight, and the amount of reducing agent may be from about 50 ppm to about 300 ppm, based upon the total weight of the durum wheat ingredient and no-gluten or low-gluten content starchy material used to form the machinable dough. The dough may be sheeted, cut into pieces, and baked to a moisture content of less than about 4% by weight. The doughs may be used to produce reduced-fat, low-fat, or zero-fat chip-like products which provide a snapping or cracking sound upon breaking. The reducing agent promotes machinability and a crunchy, non-mealy chip-like texture in the snack.

24 Claims, No Drawings

U.S. PATENT DOCUMENTS

| | | |
|---|---|---|
| 3,615,697 | 10/1971 | Hollenbeck . |
| 3,652,294 | 3/1972 | Marotta et al. . |
| 3,690,895 | 9/1972 | Amadon et al. . |
| 3,698,309 | 10/1972 | Steels . |
| 3,698,914 | 10/1972 | Kortschot et al. . |
| 3,698,915 | 10/1972 | Glasgow . |
| 3,753,729 | 8/1973 | Harms et al. . |
| 3,753,735 | 8/1973 | Gerkens . |
| 3,800,050 | 3/1974 | Popel . |
| 3,821,441 | 6/1974 | Tomita et al. . |
| 3,857,982 | 12/1974 | Sevenants . |
| 3,860,735 | 1/1975 | Hoshino . |
| 3,864,505 | 2/1975 | Hunter et al. . |
| 3,873,748 | 3/1975 | Schwab et al. . |
| 3,886,291 | 5/1975 | Willard . |
| 3,922,370 | 11/1975 | Prakash . |
| 3,925,567 | 12/1975 | Abe . |
| 3,935,322 | 1/1976 | Weiss et al. . |
| 3,937,848 | 2/1976 | Campbell et al. . |
| 3,946,116 | 3/1976 | Weaver et al. . |
| 3,956,517 | 5/1976 | Curry et al. . |
| 3,982,032 | 9/1976 | Koizumi . |
| 3,988,875 | 11/1976 | Fay . |
| 3,997,684 | 12/1976 | Willard . |
| 3,998,975 | 12/1976 | Liepa . |
| 4,005,139 | 1/1977 | Kortschot et al. . |
| 4,044,166 | 8/1977 | Koizumi . |
| 4,049,840 | 9/1977 | Reesman et al. . |
| 4,073,958 | 2/1978 | Abe . |
| 4,109,012 | 8/1978 | Bates et al. . |
| 4,109,024 | 8/1978 | Cremer . |
| 4,122,198 | 10/1978 | Wisdom et al. . |
| 4,126,706 | 11/1978 | Hilton . |
| 4,135,004 | 1/1979 | Finkel . |
| 4,140,801 | 2/1979 | Hilton et al. . |
| 4,163,804 | 8/1979 | Meyer et al. . |
| 4,167,588 | 9/1979 | Willard . |
| 4,170,659 | 10/1979 | Totino et al. . |
| 4,208,476 | 6/1980 | Tsao . |
| 4,238,517 | 12/1980 | Bosley, Jr. et al. . |
| 4,266,920 | 5/1981 | Hayashi et al. . |
| 4,272,554 | 6/1981 | Schroeder et al. . |
| 4,277,510 | 7/1981 | Wicklund et al. . |
| 4,293,582 | 10/1981 | Hamann et al. . |
| 4,312,892 | 1/1982 | Rubio . |
| 4,362,754 | 12/1982 | Wenger et al. . |
| 4,409,250 | 10/1983 | Van Hulle et al. . |
| 4,418,088 | 11/1983 | Cantenot . |
| 4,439,459 | 3/1984 | Swartley . |
| 4,446,163 | 5/1984 | Galle et al. . |
| 4,455,321 | 6/1984 | Glabe et al. . |
| 4,505,942 | 3/1985 | Ito et al. . |
| 4,508,739 | 4/1985 | Ryan . |
| 4,517,204 | 5/1985 | Mottur et al. . |
| 4,526,800 | 7/1985 | Howard . |
| 4,528,202 | 7/1985 | Wang et al. . |
| 4,537,786 | 8/1985 | Bernard . |
| 4,560,569 | 12/1985 | Ivers . |
| 4,567,051 | 1/1986 | Baker et al. . |
| 4,568,557 | 2/1986 | Becker et al. . |
| 4,609,557 | 9/1986 | Mao et al. . |
| 4,615,901 | 10/1986 | Yoshioka et al. . |
| 4,623,548 | 11/1986 | Willard . |
| 4,623,550 | 11/1986 | Willard . |
| 4,640,843 | 2/1987 | Matuszak et al. . |
| 4,645,679 | 2/1987 | Lee, III et al. . |
| 4,650,687 | 3/1987 | Willard et al. . |
| 4,749,579 | 6/1988 | Haydock et al. . |
| 4,752,493 | 6/1988 | Moriki . |
| 4,756,916 | 7/1988 | Dreher et al. . |
| 4,767,633 | 8/1988 | Fowler . |
| 4,769,253 | 9/1988 | Willard . |
| 4,770,891 | 9/1988 | Willard . |
| 4,834,996 | 5/1989 | Fazzolare et al. . |
| 4,855,151 | 8/1989 | Fielding . |
| 4,861,609 | 8/1989 | Willard et al. . |
| 4,863,750 | 9/1989 | Pawlak et al. . |
| 4,873,093 | 10/1989 | Fazzolare et al. . |
| 4,876,101 | 10/1989 | Willard . |
| 4,876,102 | 10/1989 | Feeney et al. . |
| 4,879,126 | 11/1989 | Willard et al. . |
| 4,880,371 | 11/1989 | Spinelli et al. . |
| 4,889,733 | 12/1989 | Willard et al. . |
| 4,889,737 | 12/1989 | Willard . |
| 4,910,031 | 3/1990 | Budd et al. . |
| 4,917,908 | 4/1990 | Prosise . |
| 4,917,909 | 4/1990 | Prosise . |
| 4,919,965 | 4/1990 | Childers, Jr. . |
| 4,929,461 | 5/1990 | Schonauer et al. . |
| 4,931,303 | 6/1990 | Holm et al. . |
| 4,933,194 | 6/1990 | Barry et al. . |
| 4,933,199 | 6/1990 | Neel et al. . |
| 4,938,982 | 7/1990 | Howard . |
| 4,970,084 | 11/1990 | Pirrotta et al. . |
| 4,973,481 | 11/1990 | Hunt et al. . |
| 4,976,982 | 12/1990 | Gillmore et al. . |
| 4,985,262 | 1/1991 | Camire et al. . |
| 4,994,295 | 2/1991 | Holm et al. . |
| 5,061,507 | 10/1991 | Aulik et al. . |
| 5,085,884 | 2/1992 | Young et al. . |
| 5,110,613 | 5/1992 | Brown et al. . |
| 5,147,675 | 9/1992 | Gage et al. . |
| 5,171,600 | 12/1992 | Young et al. . |
| 5,188,859 | 2/1993 | Lodge et al. . |
| 5,258,196 | 11/1993 | Lohan et al. ............... 425/560 |
| 5,283,071 | 2/1994 | Taylor et al. . |
| 5,320,858 | 6/1994 | Fazzolare et al. ............... 426/549 |
| 5,429,834 | 7/1995 | Addesso et al. . |
| 5,464,642 | 11/1995 | Villagran et al. . |
| 5,464,643 | 11/1995 | Lodge . |
| 5,500,240 | 3/1996 | Addesso et al. . |

PRODUCTION OF CHIP-LIKE DURUM WHEAT-BASED SNACKS

FIELD OF THE INVENTION

The present invention relates to the production of durum wheat-based snacks having a crunchy, fracturable, chip-like texture and appearance.

BACKGROUND OF THE INVENTION

Durum flour and semolina are used in the production of pasta products such as macaroni and spaghetti. Durum wheat is a hard winter wheat which has a gluten content which enables the production of cohesive, extrudable doughs which can be shaped, stretched, and cut into pieces. When dried, it provides a hard, brittle shaped product which upon subsequent boiling yields a soft, pliable pasta product. However, in the production of a chip-like snack, a machinable dough which may be produced at room temperature and which is bakeable to a crisp texture is desired.

Starch-based compositions which have little or no gluten, such as potato flour or corn flour, when mixed with water, do not form a dough at room temperature that is coherent and continuously machinable or sheetable. Machinability of doughs made from ingredients having little or no gluten may be improved by forming a dough under elevated temperature conditions, such as by steaming the ingredients as disclosed in U.S. Pat. Nos. 4,873,093 and 4,834,996 to Fazzolare et al.

U.S. Pat. Nos. 4,931,303 and 4,994,295 to Holm et al disclose that in the production of fabricated snack products having controlled surface bubbling, the dough sheet must have cohesive properties which permit the surface or surfaces of the dough or preform to stretch relatively uniformly when forming bubbles during frying. The highly cohesive, non-adhesive dough, it is disclosed, can be made by adjusting the quantity of free gelatinized starch, the degree of retrogradation of the starch (thereby affecting the water absorption of a given quantity of the starch), and the concentration of any starch-complexing emulsifiers present. In the Holm et al process, a dough may be formed comprising, e.g. potato solids or corn solids, raw or pre-gelatinized starches, modified starches, flavorings, oils, and the like. In the Holm et al process, substantial moisture reduction of the dough is achieved by frying. During frying, the dough moisture content of about 30% to about 55% is reduced to obtain a fried product with a moisture content of about 1–2%.

U.S. Pat. No. 4,560,569 to Ivers discloses that in the production of a dough-based fried food product, a processed starch in either gelatinized or ungelatinized form is frequently added when a low starch flour or flake is employed. Water, it is disclosed, is required to soften the flour, and depending upon the protein content of the flour, to form a network of protein (gluten) which is the framework of the product. According to Ivers, starch, which is present in flours, is used as a binder and is required for the unleavened product to expand upon frying. Dough stickiness and hardness of the cooked product may be controlled by the addition of oil to the dough to control the extent of the protein framework. The dough is prepared by adjusting the ratios of components and the mixing time to allow it to sheet uniformly at the desired thickness without sticking or tearing. According to Ivers, addition of a small amount of a lecithin-in-water suspension to the formulation of the dough-based fried snack foods improves the transfer, sheeting and cutting, and significantly reduces clumping during frying without the rapid buildup of free fatty acids and without significant darkening of frying oil normally associated with the frying of foods containing lecithin.

U.S. Pat. No. 4,976,982 to Gillmore et al discloses a method for preparing low calorie pasta products comprising glutinous flour, an added fiber source, a reducing agent and water. The use of a reducing agent neutralizes oxidizers present in or on the surface of the added fiber source, whereby improved texture and mouth feel of high fiber-containing pasta is achieved.

According to Matz, *Cookie and Cracker Technology*, 2nd ed., AVI Publishing, pp 11–12 (1968), the characteristics of a flour, due to a given quality and quantity of gluten, can be changed by the action of various nonproteinaceous modifying substances, particularly reducing agents and oxidizing agents. The usual effect of reducing agents such as sulfite, cysteine, and reduced glutathione, it is disclosed, is to make the doughs softer, stickier, and less elastic.

In the present invention, a durum wheat-based ingredient, preferably durum wheat flour is used to produce baked, chip-like snacks having a very crisp or crunchy texture and chip-like appearance from coherent, machinable, sheetable doughs containing a no- or low-gluten content starchy material such as potato flakes.

SUMMARY OF THE INVENTION

In embodiments of the present invention, a very crispy or crunchy chip-like snack may be produced from a dough comprising a) a durum wheat-based ingredient, preferably durum wheat flour, b) a no- or low-gluten content starchy material, c) water, and d) a reducing agent which imparts crispness to the baked product. The gluten-containing durum wheat ingredient imparts extensibility and machinability to the dough. However, when used in excessive amounts, it tends to result in a mealy, or leavened cracker-like texture in the baked product. A dough which is excessively elastic may also result from a high durum wheat ingredient content. The dough may contract or may not substantially retain a desired dimension upon sheeting. It is believed the no- or low-gluten starchy material tends to disrupt the durum gluten matrix, reduces dough viscosity and elasticity, and softens the texture of the baked product. It has been found that the inclusion of a reducing agent in the dough not only aids machinability but also promotes a very crispy or crunchy chip-like texture in the baked product, rather than a mealy, leavened cracker-like texture. These machinable doughs may be formed at room temperatures without the need for steaming or heat treatment to develop cohesiveness, extensibility, and machinability. The dough-like composition may be machined using conventional cracker dough technology involving dough sheet thickness reduction and cutting of the dough sheet into pieces.

In embodiments of the present invention, the amount of durum wheat ingredient ranges from about 45% to about 75%, preferably from about 50% by weight to about 70% by weight, based upon the total weight of durum wheat ingredient and no- or low-gluten starchy material used to form the dough-like machineable composition. The amount of reducing agent may range from about 50 ppm to about 300 ppm, based upon the total weight of durum wheat ingredient and no- or low-gluten starchy material used to form the dough or dough-like machineable composition. The moisture content of the dough or dough-like composition may range from about 25% to about 55% by weight, preferably from about 30% by weight to about 45% by weight, based upon the weight of the composition.

The doughs or dough-like mixtures of the present invention may be baked to reduce their moisture content to less than about 10% by weight, preferably less than about 5% by weight, most preferably less than about 4% by weight. Very crisp, crunchy, fracturable, non-crumbly chip-like snacks which give a "snapping" or "cracking" sound upon being broken in half by hand may be obtained in the present invention without frying.

In preferred embodiments of the present invention, a baked, chip-like snack having a very crisp or crunchy, non-mealy texture and a blistered appearance may be produced from a dough-like mixture comprising from about 55% by weight to about 65% by weight durum flower, and from about 50 ppm to about 300 ppm of sodium metabisulfite, based upon the total weight of durum flour and dehydrated potato flakes used to form the dough-like mixture. The dough may be reduced in thickness to form a thin sheet, and then cut into pieces. The dough pieces are baked to reduce their moisture content and to obtain chip-like products having a blistered appearance substantially throughout their surface and a very crisp, crunchy, snappy texture.

DETAILED DESCRIPTION OF THE INVENTION

Durum wheat flour and a reducing agent are used in embodiments of the present invention to produce baked, chip-like snacks having a very crisp texture and chip-like appearance from coherent, machineable, sheetable doughs containing a no- or low-gluten content starchy material such as potato flakes. The high damaged starch content of durum wheat flour, it is believed, starves the durum gluten of water needed for development of the gluten. It is believed that the hydrated potato flakes or other no- or low- gluten content starchy materials in the dough act to "dilute" the durum gluten and thereby limit the development of the durum gluten network in the dough. It is believed that the reducing agent compensates for this reduced functionality of the durum gluten.

Durum wheats were originally grown in Russia in a cold, dry climate. They were imported into the United States, bred, and improved into newly developed varieties. The durum wheat kernel is very hard, and both the endosperm and the individual starch kernels are translucent. The kernel is high in carotenoid pigments, particularly xanthophyll and taraxanthin. This hardness and translucency is dependent on the durum being grown in a dry cool climate, as in the Dakotas and in western Minnesota.

In commercially milled wheat flours, the percentage of starch granules damaged mechanically during milling to flour varies directly with the hardness of the grain. Generally, in soft wheat flour, 1% to 2% of the starch granules are damaged. In hard wheat flour, from 3 to 4%, while in durum flour, from 6 to 8% are generally damaged. The starch of durum wheat is more subject to amylase attack than is the starch of common wheats. The swelling capacity of durum starch is greater than that of hard red spring wheat. The sugar content of durum flours is somewhat higher than that of other wheat flours.

The gluten of durum wheat has different characteristics from those of bread wheat. In the dry state, this results in a very hard endosperm which is much harder than that of the common hard wheats. However, when a dough is made from durum semolina or flour, it is not as tough or elastic as dough made from hard wheat. The durum dough will extrude through a small hole at lower pressure than will hard wheat dough.

Durum products or ingredients which may be used in the present invention include durum semolina, durum granular, durum flour and mixtures thereof. Durum flour is preferred. Durum semolina is the purified or isolated middlings of durum wheat prepared by grinding and bolting cleaned durum wheat to such fineness that when tested by the method prescribed in 21 CFR § 137.300(b)(2), it all passes through a No. 20 U.S. sieve, but not more than 3 percent passes through a No. 100 U.S. sieve. The semolina is freed from bran coat or bran coat and germ to such an extent that the percent of ash therein, calculated to a moisture-free basis, is not more than 0.92 percent. The durum granular product is a semolina to which flour has been added so that about 7% passes through the No. 100 U.S. sieve. Durum flour has not less than 98 percent passing through the No. 70 U.S. sieve. Exemplary amounts of durum wheat products which may be used in the present invention may range from about 20% by weight to about 55% by weight, preferably from about 30% by weight to about 45% by weight, based on the total weight of the dough or dough-like composition.

The crunchy, gelatinized starch-based or -containing snack foods of this invention may include conventional starchy materials or ingredients having starch other than that from durum wheat in amounts which promote or do not adversely affect machinability and attainment of a very crispy or crunchy, non-mealy, fracturable texture. Exemplary amounts of the durum wheat ingredient, such as durum wheat flour for obtaining a machinable dough which is bakeable to a crunchy, fracturable, non-crumbly texture may range from about 45% by weight to about 75% by weight, preferably from about 50% by weight to about 70% by weight, most preferably from about 55% to about 65% by weight, based upon the total weight of durum wheat ingredients and other starchy materials used to form the machineable dough or dough-like compositions of the present invention. Lower amounts of the durum wheat ingredient tend to result in a flinty texture, like that of thick potato chips. Higher amounts of the durum wheat ingredient tend to result in a more mealy, leavened, cracker-like texture.

Commercially available native or modified cereal, root, or leguminous starches, and partially or completely gelatinized starches and ingredients containing them may be used. Preferred embodiments are made from dried or dehydrated potato products such as potato flakes. Desirable alternative embodiments can be made from potato flour, potato granules, corn flour, masa corn flour, corn grits, and corn meal, and other ingredients either used separately or in various combinations. Each of these ingredients has a high starch content, but is absent of gluten. When mixed with water these ingredients have essentially no elasticity because of their lack of gluten. The inability to stretch makes the wet compositions prepared from these ingredients unsuitable for conventional handling and machining, as used in cracker technology.

Other starch-containing ingredients can be used in alternative embodiments of this invention. Examples of other non-gluten, starch-containing ingredients include buckwheat flour, rice flour, oat flour, bean flour, such as black bean flour, barley flour, tapioca, and mixtures thereof. Non-gluten, starch-containing ingredients can also be blended with gluten-containing ingredients to vary the flavor and/or texture of the final product. Gluten-containing ingredients which can be used include wheat germ, wheat flour, rye flour, sorghum flour, and graham flour.

In the production of potato-based products, continuous dough sheet formation without substantial tearing may be obtained by the use of dehydrated potato products having both a high degree of starch gelatinization (as measured by differential scanning calorimetry (DSC)) and a high degree of starch granule disruption. Preferably, the DSC profile does not have a peak at 60° C. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for reaction with the starch. The lower the amount of available water, generally, the higher the gelatinization temperature. Gelatinization may be defined as the collapse (disruption) of molecular order within the starch granule, manifested in irreversible changes in properties such as granular swelling, native crystallite melting, loss of birefringence, and starch solubilization. The point of initial gelatinization and the temperature range over which it occurs are governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al, "The Terminology And Methodology Associated With Basic Starch Phenomena," Cereal Foods World, Vol. 33, No. 3, pgs. 306–311 (March 1988).

Functionality of the dough depends upon inter alia, availability of the gelatinized starch, and the amylopectin and amylose contents of the dough. Increasing the amylopectin content of a dough tends to result in a soft, coherent dough, film formation, sheet extensibility, puffability upon heating, a crisp texture, and a fragile baked product. Increasing the amylose content of a dough tends to result in a firm, crumbly dough, amylose network formation, increased sheet strength, limited, but maintainable expansion upon heating, a hard crunchy texture, and increased break strength in the baked product.

Starch availability is generally increased by decreased cell wall strength and by particle size reduction. Cell walls are strengthened by precooking and cooling of the potatoes in the presence of sufficient calcium to form a calcium pectinate gel during production of the dehydrated potato flakes. When the cell walls of pregelatinized potato flakes are strong, the amylose and the amylopectin are constrained and functionally unavailable. Amylose is constrained by retrogradation during cooling after precooking. As a result of the reduced functionality of the amylose, the functionality of the amylopectin is potentially enhanced. A smaller particle size, achieved by grinding, is needed to release the starch from the strong cell walls. Weak cell walls in pregelatinized potato flakes release starch but also generate fines. Excessive variation in the generation of fines may cause excessive variation in ingredient functionality and may result in stratification during shipping of the ingredient.

In the present invention, starch functionality provided by the potato flakes is enhanced when the potato flakes have weak cell walls and the ratio of the weight percent of potato flakes retained on an 80 mesh screen to the weight percent of the potato flakes retained on a 40 mesh screen is about 0.9:1 or more. At these ratios, machinable, coherent doughs with improved lamination and sheeting properties can be more readily obtained. The expansion upon heating is controlled while obtaining a crispy, crunchy-textured product with reduced breakage.

In embodiments of the present invention, the starch granules of the dehydrated potato flakes are disrupted and at least about 90% gelatinized, preferably at least about 95% gelatinized, most preferably completely gelatinized. The preferred dehydrated potato product for producing crunchy, fracturable, non-mealy potato chip-like products continuously from a continuous sheeted dough in accordance with the present invention is a ground dehydrated potato product produced from Eastern-grown Russet Burbank potatoes. Exemplary products are those produced by McCain Foods of Canada from Russet Burbank potatoes grown in Eastern Canada.

A reducing agent is included in the dough or dough-like mixture in an amount sufficient to promote machinability of the dough or dough-like mixture and a crunchy, non-mealy, fracturable, very crispy texture in the baked product. Exemplary amounts of the reducing agent may range from about 50 ppm to about 300 ppm, based upon the total weight of durum wheat-based ingredients, such as durum wheat flour, and other starchy material, such as potato flakes, used to form the machinable dough or dough-like composition. The reducing agent may be added as a separate ingredient and/or included with another ingredient such as dehydrated potato flakes.

Examples of reducing agents which may be used in the present invention are sulfhydryl reducing agents such as sodium metabisulfite, cysteine, water soluble cysteine salts, such as L-cysteine hydrochloride, hydrogen sulfide and glutathione. Sulfhydryl reducing agents are compounds containing —SH groups or compounds which are capable of initiating reactions which reduce —S—S— bonds in gluten to form —SH groups. Sulfur-containing materials, such as the sulfite salts and sulfur dioxide which may not contain a —SH group per se, may be used as reducing agents, if upon exposure to moisture, either liquid or vaporous, a —SH group, such as in sulfurous acid, is produced. Other reducing agents which may be used include compounds related to or homologous with L-cysteine hydrochloride, such as D- and DL-cysteine hydrochloride, the free bases of L-, D- and DL-cysteine, L-cysteine mono-phosphate, di-L-cysteine sulfite and L-mono-cysteine tartrate. Various sulfite salts such as potassium bisulfite and sodium or potassium sulfite may also be utilized. Related compounds such as hydrosulfite and pyrosulfite salts may also be employed as reducing agents to promote machinability and a crunchy baked product texture. Sodium metabisulfite is the preferred reducing agent for use in the present invention. The reducing agents may be used alone or in combination.

The amount of water added to produce the machinable doughs or dough-like compositions of the present invention should be sufficient to provide a moisture content of from about 25% by weight to about 55% by weight, more preferably from about 30% to about 45% by weight, based upon the weight of the dough or dough-like composition.

One or more emulsifiers may be included in the doughs or dough-like mixtures of the present invention to facilitate dough mixing, reduce dough stickiness, and facilitate machining.

Preferred emulsifiers for the production of durum wheat and potato-based snacks in accordance with the present invention are mono- and di-glycerides, and fluid, unbleached lecithin derived from the phosphatides of phospholipids of soybean oil. This fluid lecithin is an oil-based flowable liquid at room temperature and typically has a moisture content of less than or equal to about 1% by weight. Exemplary amounts of the fluidized lecithin or other emulsifiers may range from about 0.1% to about 1% by weight, based on the weight of the dough or dough-like mixture.

The crunchy chip-like snacks of the present invention may include conventional flavoring and leavening agents.

Sugar may be included in the dough in amounts ranging up to about 12% by weight, preferably from about 2% to about 10% by weight, based upon the weight of the durum wheat ingredient, such as durum wheat flour. Salt may be added to the dough in an amount of up to about 5% by weight, based upon the weight of the durum wheat ingredient.

Exemplary leavening agents which may be used include sodium bicarbonate, calcium phosphate, monobasic, and calcium acid pyrophosphate. The one or more leavening agents may be used up to about 5% by weight, based upon the weight of the durum wheat ingredient. For example, calcium phosphate, monobasic may be used in amounts ranging from about 0.25 to about 2.0% by weight and the sodium bicarbonate may be used in amounts ranging from about 0.5% to about 2.5% by weight, based upon the weight of the durum wheat ingredient used to produce the machinable dough or dough-like mixture.

Conventional snack flavoring ingredients or seasonings may be blended into the dough composition or sprinkled upon the dough composition before baking or applied to the product after baking in effective flavoring and seasoning amounts. Exemplary flavoring ingredients and seasonings which may be used include barbecue, sour cream, onion, garlic, bacon, chicken, beef, cheese, ham, peanut butter, nuts and seeds, vanilla, chocolate products, spices, autolyzed yeast extract, salsa, jalapena, and mixtures thereof. Corn germ may be included in flavor- and texture-modifying amounts. Corn germ is a by-product of milling corn and imparts a sweet flavor and crunchy texture to starchy snack food products. Exemplary amounts of the corn germ which may be used are up to about 20% by weight of the starch-containing ingredients other than durum wheat flour.

Vegetable shortening or oil can also be present in an amount less than 20 percent, preferably less than 10 percent of the finished product. Preferably, the doughs or dough-like compositions have a fat or oil content of less than about 5% by weight of the dough or dough-like mixture. The remainder of the oil may be applied topically to the machined and cut pieces before baking or to the final product after baking. Vegetable shortening and oil may be used to affect flavor and texture modifications of the final product. For example, the shortening or oil may serve as a carrier for topically applied flavorings and seasonings.

The doughs and dough-like compositions may be used to produce reduced-fat, low-fat, and no-fat crunchy snack chips. As used herein, a reduced-fat food product is a product having its fat content reduced by at least 25% by weight from the standard or conventional product. A low-fat product has a fat content of less than or equal to about two grams of fat per 30 gram serving. A no-fat or zero-fat product has a fat content of less than or equal to about 0.5 grams of fat per 30 gram serving or less than or equal to about 1.67% fat, based upon the total weight of the final product.

Shortening or fat which may be used in producing reduced-fat or low-fat chip-like products in accordance with the present invention may be any edible fat or oil or mixture thereof suitable for baking applications and may include conventional food-grade emulsifiers. Vegetable oils, lard, marine oils, and mixtures thereof which are fractionated, partially hydrogenated, and/or interesterified are exemplary of the shortenings or fats which may be used in the present invention.

The machinable doughs may be produced in accordance with the present invention at temperatures of less than about 125° F., preferably less than about 110° F. and most preferably at temperatures of about 80° F. to 105° F. Ingredients may be added at 50° F. or above and mixed to form a dough without the application of external heat such as from steam injection or heating jackets. Heat generated by the mechanical mixing action in the mixer or heat provided by ingredients added at elevated temperatures may be used to maintain the dough temperature within a desired range. For example, water may be added at a temperature of about 50° F. to about 90° F. to other ingredients which are at about 70° F. to about 75° F. to obtain a final dough temperature in the preferred range of about 88° F. to 98° F.

The doughs or dough-like mixtures of the present invention may be prepared in conventional dough mixing equipment such as an upright mixer or a continuous mixer or extruder. The dry ingredients such as the durum wheat flour, other starchy materials, such as dehydrated potatoes, sugar, salt, leavening agents, and dry flavoring ingredients may be admixed in a dough mixer to obtain a substantially homogeneous dry-blend. The reducing agent, such as sodium meta-bisulfite may be dissolved in a portion of the water along with any optional coloring and flavoring agents. The amount of water added in this stage may range up to about 50% by weight of the total amount of added water. Lecithin may preferably be premixed in the melted shortening or fat, or oil which is utilized in the formulation. In the next mixing stage, the oil/lecithin preblend, the dissolved reducing agent and optional coloring and flavoring may be admixed with the substantially homogeneous dry-blend to obtain a substantially homogeneous mixture. Then, the remaining water may be added to substantially uniformly hydrate the durum wheat flour and other starchy materials and to obtain a substantially homogeneous dough or dough-like mixture. The dough may be permitted to lay for up to about 90 minutes, preferably less than 30 minutes prior to machining.

Various machining processes can be used in producing the crunchy durum wheat-based snacks of the present invention. Machining can include the processes used in standard cracker technology. Alternative machining processes include the use of a tortilla chip machine in which the dough-like composition is rolled and formed into pieces without being laminated.

In a preferred machining process, the dough or dough-like mixture is formed into a sheet by gauge or reduction rollers. In embodiments of the invention, the sheeted dough may be laminated in a dough-laminating machine. The laminating operation can be performed by overlapping lamina of about one-fourth inch thickness each, such that one sheet is placed upon another. Typically, between 3 to 6 laminae are layered together during this operation. The laminate may be formed by folding the sheeted dough upon itself. Separate dough sheets may also be used to form a laminate.

The laminated or unlaminated sheet is then reduced in thickness. Reduction of the dough mass may be performed in stages. For example, after three laminae are formed into a sheet, the sheet may then be compressed to about one-sixteenth inch. For four laminae, the dough sheet may first be reduced in thickness to about ½" and then to about ¼". In each case, a final reduction in thickness is performed by a gauge roller. The dough may be reduced during this operation to a final thickness of about 1/32 of an inch. At this point, the sheet generally has a width to thickness ratio of at least about 350.

The machined dough-like composition may then be cut into dough pieces. Cutting can be performed by a reciprocating cutter, a rotary cutter, or other dough-cutting mechanisms. The cut dough pieces may be triangular, rectangular, square, or circular in shape, shaped like a potato slice, or any other desirable configuration. Triangular dough pieces may have side lengths of about 1 inch to about 2 inches. The circular dough piece may have a diameter of about 1¾ inches. For a potato slice configuration, the maximum length of the dough piece may range from about 2 inches to about 3.5 inches. The maximum width of the dough piece may range from about 1.25 to about 2.5 inches. Topping salt can be added at about 1% to 2% of the final product weight.

Dockering or piercing the uncut sheet or cut pieces can optionally be included in the machining operation. Each dough piece preferably contains from about 3 to about 6 docker holes. Dockering decreases the occurrence of "checking" or the formation of undesirable stress lines that cause breakage in the final product. The cut pieces may then be conveyed or transported to a convection oven for baking.

The dough-sheeting, -cutting, and -dockering operations may occur at substantially the same dough temperature and moisture content of the dough produced in the mixer. Thus, the dough pieces upon entering a baking oven may have a temperature of less than or equal to about 125° F., preferably less than or equal to about 110° F., more preferably about 80° F. to about 105° F., and a dough moisture content of about 30% by weight to about 45% by weight. During the baking step, the dough moisture content is substantially reduced to form blistering over the surfaces of the baked pieces. The dough-piece moisture content is preferably reduced from above about 30% by weight to preferably less than about 4% by weight during baking.

The dough pieces may be baked in conventional ovens, preferably a conventional gas-fired band oven having a plurality of temperature zones. The substantial reduction of the moisture content of the dough pieces in the baking oven causes the formation of blisters substantially throughout the surfaces of the baked piece. In addition, the substantial reduction in moisture content substantially reduces checking of the final product. Upon exiting the gas-fired band oven, the baked pieces most preferably have a moisture content of less than or equal to about 3.5% by weight and may have a temperature of about 190° F. to about 250° F. Exemplary baking temperatures range from about 220° F. to about 650° F. Baking times may range from about 2 minutes to about 7 minutes. The fast application of higher temperatures yields a rapid formation of steam within the dough pieces. Steam, present within the pieces, gives rise to blister formation as the pieces are being baked. The exterior portions of the pieces dry rapidly and trap steam formed in the internal portions of the pieces. As the steam forms under an external layer, it performs a function similar to that of the leavening agents and causes expansion of the dough-like composition.

After baking in the gas-fired oven, the dough pieces are preferably further dried by dielectric energy application which disperses the moisture present within the piece and decreases its total moisture. Preferably, the dielectric heating step reduces the moisture content to a level which is from about 0.5% to about 2% by weight lower. For example, if the moisture content leaving the gas-fired oven is about 2.3% to about 3.8% by weight, the dielectric heating may preferably reduce the moisture content of the pieces to about 1.3% by weight to about 1.8% by weight. In preferred embodiments of the present invention, the moisture content of the dough pieces leaving the dielectric oven is less than or equal to about 2% by weight. The dielectric heating tends to remove moisture from the areas of the dough piece having a higher moisture content, thereby reducing moisture gradients within the piece which tend to cause checking.

In preferred embodiments, the dielectrically treated pieces are sprayed with oil to increase palatability and provide a medium for the adhesion of seasoning ingredients. In addition, the dielectrically heated pieces may be further subjected to moisture equilibration in an annealing tunnel to further reduce checking. Annealing may be performed at temperatures of from about 140° F. to about 180° F. Moisture reduction during annealing may range from about 0.2 to about 0.5%.

After annealing, the oil-sprayed product may be subjected to tumbling, brushing, electrostatic deposition, or other coating methods for the addition of particulate seasoning ingredients. The moisture content of the products upon packaging may range from about 1% to about 3.2% by weight. The products are preferably packaged in vapor-proof packaging materials. The bulk density of the snack products of the present invention may range from about 6 to about 8 lbs. per cubic foot. The snack products of the present invention may preferably contain at least one durum wheat ingredient, such as durum flour in an amount of from about 40% by weight to about 65% by weight, based upon the weight of the final product, exclusive of toppings.

In other embodiments of the present invention, the dough pieces, after having their moisture content reduced to less than about 10%, preferably less than about 5%, most preferably less than about 3.5% by weight by heating in air, such as in a gas-fired oven, may be subjected to frying to enhance flavor while keeping the fat or oil content of the final product low.

The following examples illustrate the present invention wherein all parts, percentages, and ratios are by weight, and all temperatures are in °F. unless indicated to the contrary:

EXAMPLE 1

The ingredients and their relative amounts which may be used to prepare a cohesive, machinable dough for producing a low-fat content, durum wheat-based snack having a very thin but blistered, tortilla chip-like appearance and a crunchy, fracturable chip-like texture are:

| INGREDIENTS | WEIGHT % BASED ON TOTAL DOUGH | PARTS BASED ON 100 LBS DURUM FLOUR |
|---|---|---|
| Durum Flour | 36.368 | 100.000 |
| Ground Potato Flakes | 24.246 | 66.667 |
| Canola Oil | 3.273 | 9.000 |
| Sucrose | 2.425 | 6.667 |
| Sodium Bicarbonate | 0.364 | 1.000 |
| Salt | 0.303 | 0.833 |
| Lecithin, Fluid Unbleached | 0.303 | 0.833 |
| Calcium Phosphate, Monobasic | 0.227 | 0.625 |
| Autolyzed Yeast Extract | 0.152 | 0.417 |
| Mono- And Di-Glycerides | 0.152 | 0.417 |
| Flavoring | 0.057 | 0.156 |
| Sodium Metabisulfite | 0.006 | 0.017 |
| Water | 32.125 | 83.333 |
| TOTAL | 100.0 | |

The potato flakes may be ground dehydrated potato flakes which are completely gelatinized as determined by Differential Scanning Calorimetry. They may be produced by McCain Foods of Canada from Russet Burbank potatoes grown in Eastern Canada.

The fluid lecithin may be an unbleached lecithin derived from the phosphatides of phospholipids of soybean oil. It is an oil-based product which is pourable at room temperatures. Its Brookfield viscosity at 77° F. is about 5500

(+/−200) cps. The moisture content of the fluid lecithin is no more than 1% by weight and its acetone-insoluble matter (phosphatides) is at least 62% by weight. The hexane-soluble matter is 0.3% by weight maximum.

In the first mixing stage, the durum flour, potato flakes, sugar, salt, autolyzed yeast extract, sodium bicarbonate and calcium phosphate, monobasic may be dry-blended in an upright dough mixer by mixing at low speed for about three minutes.

In the second mixing stage, a preblend of the lecithin and canola oil may then be added to the mixer. The flavoring and sodium metabisulfite may be dissolved in small portions of the water and then added to the dough mixer. Next, the mono- and di-glycerides may be added to the dough mixer, and mixing may be continued for about three minutes at high speed to obtain a substantially homogeneous blend.

In the third mixing stage, the remaining water at a temperature of about 95° F. to 105° F. may be added to the dough mixer while mixing about two minutes on low speed. The mixing may be continued for about one minute at low speed and then about six minutes at high speed to uniformly hydrate the durum flour and potato flakes and to obtain a cohesive, substantially homogeneous dough-like mixture. The amount of added water in this stage may be about 95% by weight of the total amount of added water used to form the machinable dough. On a calculated basis, the moisture content of the dough (which includes the moisture present in the ingredients as well as the added water of stages 2 and 3) may be about 37% to about 42% by weight, based upon the total weight of the dough.

In the three mixing stages, the ingredients may be mixed in an open vessel at atmospheric pressure without external heating to obtain a final dough temperature of about 88° F. to 98° F. The dough may then be transferred to conventional reduction rollers to form a continuous sheet of about ¼ inch in thickness. The dough sheet may then be reduced in thickness in two stages to a thickness of about 1/32 inch using reduction rollers. The first stage of rollers may reduce the sheet thickness to about ⅛ inch. The last stage of rollers may reduce the dough sheet thickness from about ⅛ inch to the final 1/32 inch.

The thin sheet may then be cut into triangular-shaped pieces, each weighing about 11 to 12 grams, using a rotary cutter. The pieces may be equilateral triangles having a side length of about 1¾ inches. The scrap may be removed, and the pieces may then be conveyed through a conventional gas-fired band oven having a plurality of temperature zones. The rotary cutter may also impart four dockering holes per dough piece. Upon entry into the oven, the dough pieces may still have a moisture content of about 38% to about 40% by weight. The band temperature may range from about 310° F. to about 330° F., and the baking time may range from about 3 minutes to about 4 minutes, for baking the pieces to a moisture content of less than about 3.2% by weight and a shelf-stable relative humidity or "water activity" of less than about 0.7. Upon exiting the gas-fired oven, the pieces have a blistered, chip-like appearance.

The thus baked product may then be transferred to a dielectric oven which may reduce the moisture content of the pieces by about 0.5%, that is to a moisture content of less than or equal to about 2.7%.

The dielectrically heated product may then be transferred to a tunnel where it is sprayed with canola oil. The sprayed product may then be transferred to an annealing tunnel to equilibrate its moisture and to reduce the moisture content by about 0.2% to about 0.4%, that is to a moisture content of less than about 2.5%. The annealed product may then be transferred to a tumbler for the addition of salsa and cheddar cheese seasonings. The seasoned product may then be transferred to a packaging operation for packaging in moisture-proof bags. The final oil-sprayed product may have an oil content of about 14.5% to about 19.5% by weight, based upon the weight of the final product.

EXAMPLE 2

A durum wheat-based chip-like product may be produced as in Example 1, except the autolyzed yeast extract may be eliminated, and the topically applied salsa and cheddar cheese seasonings may be replaced by topically applied cheese flavoring.

EXAMPLE 3

A durum wheat-based chip-like product may be produced as in Example 1, except the moisture content of the dough pieces may be reduced to less than about 5% by weight in the gas-fired oven, and then the dough pieces may be fried in a conventional fryer to obtain a very crisp, crunchy, non-mealy chip-like product having an oil content of less than about 20% by weight.

What is claimed is:

1. A method for the production of durum wheat-based chip-like snacks comprising: forming a machinable dough at a temperature of less than about 125° F. by admixing ingredients consisting essentially of a durum wheat-based ingredient for forming a gluten matrix, a no-gluten or low-gluten content starchy material for disrupting the gluten matrix, water, and a reducing agent for promoting machinability and a crunchy, non-mealy chip-like texture in the snack, wherein the mount of the durum wheat-based ingredient is from about 45% by weight to about 75% by weight, and the mount of reducing agent is from about 50 ppm to about 300 ppm, said mounts being based upon the total weight of the durum wheat-based ingredient and no-gluten or low-gluten content starchy material used to form the machinable dough, sheeting the dough, forming the dough into pieces, and baking the dough pieces to obtain a snack with a crunchy, fracturable, chip-like texture and appearance.

2. A method as claimed in claim 1 wherein the mount of the durum wheat-based ingredient is from about 50% by weight to about 70% by weight, based upon the total weight of the durum wheat-based ingredient and no-gluten or low-gluten content starchy material used to form the machinable dough.

3. A method as claimed in claim 1 wherein said durum wheat-based ingredient comprises durum wheat flour and said reducing agent comprises sodium metabisulfite.

4. A method as claimed in claim 3 wherein said no- or low-gluten content starchy material comprises dehydrated potato flakes.

5. A method as claimed in claim 4 wherein said durum wheat flour and said dehydrated potato flakes are dry-blended and then admixed with water and sodium metabisulfite.

6. A method as claimed in claim 1 wherein said pieces are baked to reduce their moisture content to less than about 4% by weight to obtain pieces having a blistered appearance substantially throughout their surfaces.

7. A method as claimed in claim 1 wherein said machinable dough is formed at a temperature of less than about 110° F.

8. A method as claimed in claim 1 wherein said machinable dough is formed without the application of external heat.

9. A method as claimed in claim 1 wherein said machinable dough is formed at a temperature of from about 80° F. to 105° F.

10. A method for increasing the crunchiness of potato-based baked snacks produced from a dough comprising dehydrated potato flakes, said method comprising replacing a substantial portion of the dehydrated potato flakes used to form the dough with durum wheat flour and sodium metabisulfite, the amount of durum wheat flour being from about 45% by weight to about 75% by weight, and the amount of sodium metabisulfite being from about 50 ppm to about 300 ppm, said amounts being based upon the total weight of durum wheat flour and dehydrated potato flakes, admixing ingredients consisting essentially of water, the durum wheat flour, dehydrated potato flakes and sodium metabisulfite to form a dough at a temperature of less than about 125° F., sheeting the dough, forming the dough into pieces, and baking the dough pieces to a moisture content of less than about 4% by weight.

11. A method as claimed in claim 10 wherein said dough is formed at a temperature of less than about 110° F.

12. A method for producing low-fat chip-like snacks having a crunchy, fracturable, non-mealy texture comprising: a) admixing ingredients consisting essentially of a durum wheat-based ingredient, a no-gluten or low-gluten content starchy material, water, and a reducing agent to form a machinable dough at a temperature of less than about 125° F., the amount of durum wheat-based ingredient being from about 45% by weight to about 75% by weight, and the amount of reducing agent being from about 50 ppm to about 300 ppm, said amounts being based upon the total weight of the durum wheat-based ingredient and no-gluten or low-gluten content starchy material used to form the machinable dough, b) sheeting the dough, c) cutting the dough into pieces, and d) baking the dough, pieces to a moisture content of less than about 4% by weight.

13. A method as claimed in claim 12 wherein said durum wheat: based ingredient comprises durum wheat flour and said no- or low-gluten content starchy material is alehydrated potato flakes.

14. A method as claimed in claim 13 wherein said reducing agent is sodium metabisulfite.

15. A method as claimed in claim 14 wherein said durum wheat flour and said dehydrated potato flakes are dry-blended and then admixed with the water and sodium metabisulfite.

16. A method as claimed in claim 12 wherein said machinable dough is formed at a temperature of less than about 110° F.

17. A machinable dough for producing very crisp, crunchy, fracturable, non-mealy, chip-like snacks by baking consisting essentially of a durum wheat-based ingredient, a no-gluten or low-gluten content starchy material, water, and a reducing agent, the amount of the durum wheat ingredient being from about 45% by weight to about 75% by weight, and the amount of reducing agent being from about 50 ppm to about 300 ppm, said amounts being based upon the total weight of the durum wheat-based ingredient and no-gluten or low-gluten content starchy material used to form the machinable dough, said dough having a moisture content of from about 25% by weight to about 55% by weight and being produced at a temperature of less than about 125° F.

18. A dough as claimed in claim 17 wherein said durum wheat: based ingredient comprises durum wheat flour and said no- or low-gluten content starchy material is dehydrated potato flakes.

19. A dough as claimed in claim 18 wherein said dehydrated potato flakes are produced from Eastern-grown Russet Burbank potatoes.

20. A dough as claimed in claim 17 wherein said reducing agent is sodium metabisulfite.

21. A dough as claimed in claim 17 wherein said durum wheat-based ingredient is a mixture of durum semolina and durum wheat flour.

22. A dough as claimed in claim 17 wherein said no- or low-gluten content starchy material comprises at least one member selected from the group consisting of potato flour, potato granules, corn flour, masa corn flour, corn grits; corn meal, buckwheat flour, rice flour, oat flour, bean flour, barley flour, and tapioca.

23. A very crisp, crunchy, fracturable, non-mealy, chip-like baked snack consisting essentially of from about 40% by weight to about 65% by weight of a durum wheat-based ingredient and dehydrated potato flakes, the mount of the durum wheat-based ingredient being from about 45% by weight to about 75% by weight, based upon the total weight of the durum wheat-based ingredient and dehydrated potato flakes, said snack having a blistered appearance substantially throughout its surfaces and being baked from a dough having a reducing agent in an mount of from about 50 ppm to about 300 ppm, based upon the total weight of the durum wheat-based ingredient and dehydrated potato flakes.

24. A snack as claimed in claim 23 wherein said durum wheat-based ingredient is durum wheat flour.

\* \* \* \* \*